Feb. 26, 1929.

F. W. MANNING

APPARATUS FOR CONTINUOUS EXPELLING AND CLARIFYING FRUIT JUICES

Original Filed Nov. 20, 1924

INVENTOR.
FRED W. MANNING

BY Townsend, Loftus & Abbett

ATTORNEYS.

Patented Feb. 26, 1929.

1,703,535

UNITED STATES PATENT OFFICE.

FRED W. MANNING, OF BERKELEY, CALIFORNIA.

APPARATUS FOR CONTINUOUS EXPELLING AND CLARIFYING FRUIT JUICES.

Original application filed November 20, 1924, Serial No. 751,058. Divided and this application filed February 29, 1928. Serial No. 257,875.

This application is a division of my copending application entitled Continuous expelling and clarifying process and apparatus, Ser. No. 751,058, filed November 20, 1924.

This invention relates to an improved apparatus for the expressing of liquids from solids followed by the immediate clarifying or otherwise purifying of the expressed liquids and is particularly applicable to the extraction of juices from fruits and vegetables, or oils from seeds, nuts, olives, etc., and for all other purposes wherein it is desirable to clarify or otherwise treat liquids expressed from solids.

In the parent application above referred to I have pointed out that prior practice was to expel juices from fruit and vegetables by means of such apparatus as continuous screw, cloth and rack, or hydraulic presses. The clarification was carried out in a secondary operation usually by means of plate presses, but it was more often omitted because of the attendant difficulties such as low filtering rates, action of the fruit acids on the presses, and the cost of the secondary equipment. Consequently we find improperly filtered apple and grape juice drinks offered to the public. In fact, fruit juices so produced not only lack clarification but are very often made from unwashed and partially decayed fruits and contain putrefactive bacteria.

It is the principal object of the present invention to provide a comparatively inexpensive apparatus enabling every farmer, fruit grower and housewife to convert fruit into perfectly pure and brilliantly clear juices, free from insoluble solids, colloidal suspensions, etc., for beverages, jellies, syrups and the like.

The present invention contemplates the provision of an apparatus adapted for the continuous expelling of liquids from solids and the simultaneous treating of the expelled liquids. In this apparatus the fruit or other solids is introduced into a disintegrating hopper where it is reduced as desired. After being reduced the separated portions of the solids with contained or expressed liquid are passed into a compression chamber by means of a suitable feeding means or by gravity, where the liquid is almost completely expelled from the pulp solids and is forced through a wall of either stationary or moving treating solids into a filtrate receiver. The pulp solids are passed on through and out of the apparatus by a suitable device. The forcing of the expressed liquid through the wall of treating solids is accomplished by a differential in liquid pressure between the pulp and filtrate sides of the wall which may be due to either a subatmospheric pressure on the filtrate side or mechanical pressure on the pulp side or both.

One form which the invention may assume is exemplified in the following description and illustrated by way of example in the accompanying drawings, in which.

Figure 1:
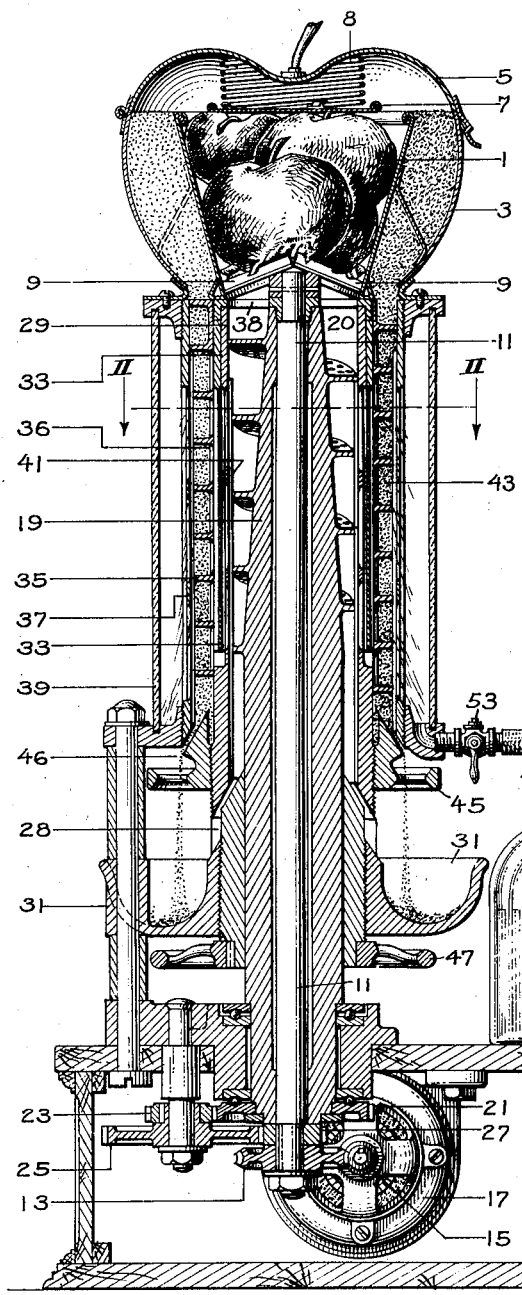
Fig. 1 is a sectional elevation of the apparatus.
Figure 2:
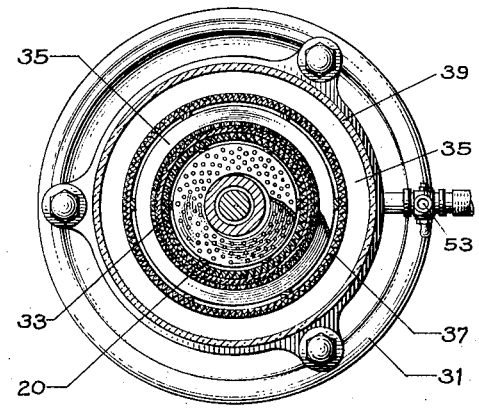
Fig. 2 is a horizontal sectional view taken on line II—II of Fig. 1.
Figure 3:
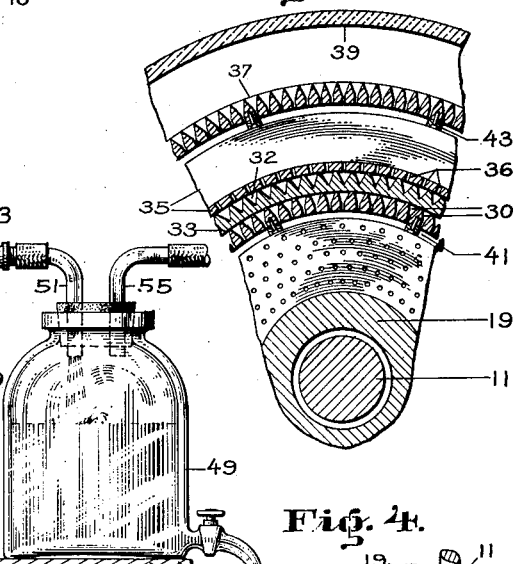
Fig. 3 is a fragmentary enlarged view of Fig. 2.
Figure 4:
Fig. 4 is a fragmentary enlarged elevation in vertical section through the compression screw.

The apparatus as shown consists of a hopper 1 for the pulp solids inside of a hopper 3 for the treating solids, both of which are closed by a hinged door 5 to which is attached a spring pressed plate 7 to force the pulp solids against the graters or crushers 9, which are driven through a shaft 11, worm gear 13, and worm 15 by a motor 17. A compression screw 19, the flights of which are perforated and covered with a coarse filtering fabric protected by a perforated wearing plate, is also driven by the motor 17 through gears 21, 23, 25 and 27 and shaft 11, the motor and all the gears being enclosed in a cabinet 18, which also forms a stand for the apparatus. Surrounding the compression screw is the inner filter wall 29, the lower end of which forms the trough 31. Over this wall and fixed permanently to it is a grooved imperforated drainage sleeve 33, around which rotates a perforated feeding screw cylinder 35 operating inside of an outer filter wall 37, surrounding which is a glass cylinder 39. The filter walls, as shown, are made from slotted pipes but they may be otherwise constructed as from suitably spaced, parallel bars, cylinders lined with filter fabric, etc.

Distance bars 41 and 43 are attached to the filter walls to prevent of the turning of the solids with the screws and disturbance of the solids next the filtering slots. The width of the filter slots in the inner and outer filter walls will usually vary between 5/1000" and 10/1000" but the width of the slots 36 in the feeding screw cylinder should be greater so that any solid matter passing through the inner filtering wall will readily pass into and be retained by the treating solids. Adjusting nuts 45 and 47 regulate the compactness of the treating and pulp solids respectively by regulating the size of the discharge openings 46 and 28. The glass filtrate receiver jar 49 is connected to the glass cylinder 39 by means of a connection 51 and threeway cock 53, and connected to a water jet vacuum pump, not shown, by means of a connection 55.

The operation of the apparatus thus constructed has been in part indicated in connection with the foregoing description. The fruit, or other solids, after being crushed or shredded in hopper 1, passes into the compression chamber 20 where the pressure exerted readily separates the juice from the pulp. The vacuum maintained in the filtrate receiver jar exhausts the air from the apparatus and causes the liquid to pass through the slots and down the outside grooves 30 of the inner filter wall and up the grooves 32 of the drainage sleeve 33 through the slots 36 of the feeding screw cylinder into and through the treating solids where it is clarified, decolorized or otherwise purified, and finally on passing through the slots of the outer filter wall 37 the liquid runs down into the filtrate receiver 49 brilliantly clear. As will be apparent, the disintegrating of the solids, the expressing of the liquid therefrom and the purifying thereof are all carried on simultaneously and in a substantially continuous manner.

The purpose of the grooved imperforate drainage sleeve 33 is to prevent air from being drawn through from the top of the compression chamber when an open hopper is used and solids are being handled that do not require total exclusion of air from the compression chamber. The feeding screw cylinder 35 is attached to and rotates with the compression screw 19, by means of a spider nut 38 although, if desirable, means may be supplied to rotate the screws independently of each other. The pitch of the flights of both screws is determined by the purpose for which the apparatus is used, the pulp solids being forced down and discharged through the opening at 28 in the lower end of the filter wall 29 into the hopper 31 as quickly as the filtrate can be forced through the treating solids, and the treating solids moved along and discharged through the opening at 46 into the same hopper through the openings in the wheel of the adjusting nut 45, before any clogging takes place. The flights of both screws are kept from direct contact with their respective filtering walls by means of distance bars 41 and 43 so that the solids may be constrained to move forwardly axially without disturbance to the solids next the filtering slots. However, in many cases these distance bars will not be necessary.

The advancing or underside of the flights of the compression screw being perforated and covered with a filter fabric protected by a thin perforated wearing plate, serves the purpose of constantly clarifying the rising liquid with the downward movement of the solids before the liquid comes in contact with the filter wall and thereby increases the filtering rate.

The present apparatus may be constructed of any suitable metal capable of withstanding the action of the juice acids such as bronze free from zinc and tinned or silvered, and may be surrounded with steam or refrigerating coils to coagulate the protein, precipitate certain solids, etc., so that these may be eliminated during the filtering period, or the fruit or other solids may be heated before being introduced into the disintegrating hopper.

While I have shown the preferred form of my invention, it is to be understood that various changes may be made in its construction by those skilled in the art without departing from the spirit of the invention.

Having thus described my invention, what I claim and desire to secure by Letters Patent is:

1. A liquid expressing and purifying apparatus consisting of a compression member operating adjacent to a treating body of solids through which the expressed liquid is forced, a filter wall and means for continuously moving the treating solids relative to the filter wall to expel the used solids and provide fresh solids in their stead.

2. A liquid expressing and purifying apparatus comprising the combination of an expressing chamber, a filter wall cooperating therewith, means in the chamber for compressing liquid-containing pulp, means cooperating with the filter wall for supporting a wall of treating solids through which the expressed liquid passes from the filter wall, and means for continuously moving the treating solids relative to the filter wall to expel the used solids and provide fresh solids in their stead.

3. A liquid expressing and purifying apparatus comprising the combination of a cylindrical expressing chamber, a filter wall surrounding the chamber, a spiral member axially in the chamber for compressing liquid-containing pulp, means surrounding the filter wall for supporting a wall of treating solids through which the expressed liquid passes from the filter wall, and means for continuously moving the treating solids to expel the used solids and provide fresh solids in their stead.

4. A liquid expressing and purifying apparatus comprising the combination of a cylindrical expressing chamber, a filter wall surrounding the chamber, and a spiral member axially in the chamber for compressing the liquid-containing pulp, the spiral flights of the member being perforated and equipped with filter fabric to provide a filter medium.

5. A liquid expressing and purifying apparatus comprising the combination of an expressing chamber, a filter wall cooperating therewith, means in the chamber for compressing liquid-containing pulp, and means cooperating with the filter wall for carrying and moving thereover an adjacent wall of treating solids through which the expressed liquid passes from the filter wall.

6. A liquid expressing and purifying apparatus comprising the combination of a cylindrical expressing chamber, a filter wall surrounding the chamber, a spiral member axially in the chamber for compressing liquid containing pulp, and a spiral member outside the filter wall for movably carrying a wall of treating solids through which the expressed liquid passes from the filter wall.

7. A liquid expressing and purifying apparatus comprising the combination of means for disintegrating a solid, an expressing chamber adapted to receive the disintegrated solids therefrom, a plurality of filter walls cooperating with the chamber, means in the chamber for compressing the disintegrated solids, and means for passing a body of treating solids between the filter walls through which the expressed liquid passes.

8. A liquid expressing and purifying apparatus comprising the combination of means for disintegrating a solid, an expressing chamber adapted to receive the disintegrated solids therefrom, a filter wall cooperating with the chamber, means in the chamber for compressing the solids, and means for continuously moving a wall of treating solids over the filter wall whereby the expressed liquid passes through the filter wall and the wall of treating solids.

9. A liquid expressing and purifying apparatus comprising the combination of an expressing chamber, a hopper cooperating therewith, disintegrating means in the hopper, a shaft connected to the said means and extending through the chamber, a spiral member for compressing the disintegrated solids, the shaft and spiral member being coaxial, a filter wall surrounding the chamber, means for driving the shaft and spiral member, and means for moving a body of treating solids over the filter wall whereby the expressed liquid passes through the filter wall and body of treating solids.

10. A liquid expressing and purifying apparatus comprising the combination of an expressing chamber, a hopper cooperating therewith, disintegrating means in the hopper, a shaft connected to the said means and extending through the chamber, a spiral member for compressing the disintegrated solids, the shaft and spiral member being coaxial, a filter wall surrounding the chamber, a spiral member for feeding a wall of treating solids over the outside of the filter wall, a motor, and operative connections therefrom for driving the said shaft and two spiral members.

11. A liquid expressing and purifying apparatus comprising the combination of an expressing chamber, a plurality of filter walls cooperating therewith, means in the chamber for compressing liquid-containing pulp, means cooperating with the filter walls for moving a body of treating solids therebetween through which the expressed liquid passes, a transparent enclosing casing outside the wall of treating solids whereby the filtering of the liquid therethrough can be observed, and suction means for drawing the fluid through the treating solids.

12. A liquid expressing apparatus comprising the combination of an expressing chamber, a filter wall cooperating therewith, and a compressing screw with perforated spirals equipped on their advancing side with filter fabric adapted to permit the expressed liquid to pass backward therethrough as the compressed solids are moved forward.

FRED W. MANNING.